(12) United States Patent
Kirchner et al.

(10) Patent No.: US 10,375,148 B2
(45) Date of Patent: Aug. 6, 2019

(54) COLOUR VARIANT SELECTION METHOD USING A MOBILE DEVICE

(71) Applicant: AKZO NOBEL COATINGS INTERNATIONAL B.V., Arnhem (NL)

(72) Inventors: Eric Jacob Jan Kirchner, Leiden (NL); Swie Lan Njo, Oegstgeest (NL); Jeroen Hoogink, Voorhout (NL)

(73) Assignee: AKZO NOBEL COATINGS INTERNATIONAL B.V., Arnhem (NL)

(*) Notice: Subject to any disclaimer, the term of this patent is extended or adjusted under 35 U.S.C. 154(b) by 1092 days.

(21) Appl. No.: 14/366,589

(22) PCT Filed: Dec. 19, 2012

(86) PCT No.: PCT/EP2012/076105
§ 371 (c)(1),
(2) Date: Jun. 18, 2014

(87) PCT Pub. No.: WO2013/092678
PCT Pub. Date: Jun. 27, 2013

(65) Prior Publication Data
US 2015/0026298 A1    Jan. 22, 2015

Related U.S. Application Data

(60) Provisional application No. 61/582,606, filed on Jan. 3, 2012.

(30) Foreign Application Priority Data

Dec. 21, 2011    (EP) .................................... 11194959

(51) Int. Cl.
*H04L 29/08*    (2006.01)
*G01J 3/02*    (2006.01)
(Continued)

(52) U.S. Cl.
CPC ............ *H04L 67/10* (2013.01); *G01J 3/0264* (2013.01); *G01J 3/0272* (2013.01); *G01J 3/463* (2013.01); *G01J 3/52* (2013.01)

(58) Field of Classification Search
CPC ..... H04L 67/10; G01J 3/46; G01J 3/50; G01J 3/52; G01J 3/463; G01J 3/0272;
(Continued)

(56) References Cited

U.S. PATENT DOCUMENTS

2003/0153265 A1* 8/2003 Hunt ................. H04L 29/06027
                                                        455/3.06
2005/0128484 A1* 6/2005 Rodrigues ............... G01J 3/463
                                                        356/402
(Continued)

FOREIGN PATENT DOCUMENTS

WO     01/44767        6/2001
WO     2004/018984     3/2004
(Continued)

OTHER PUBLICATIONS

International Search Report for International Application No. PCT/EP2012/076105, dated May 27, 2013.
(Continued)

*Primary Examiner* — Jamil Ahmed
(74) *Attorney, Agent, or Firm* — McDonnell Boehnen Hulbert & Berghoff LLP

(57) ABSTRACT

The invention relates to a method of selecting the most probable variant of a matching paint candidate color standard for vehicle repair using a mobile device having a color display and an input unit and which is capable of data exchange with a central computer via an at least partly wireless communication line, wherein verbal or symbolic characterizations describing visual differences between a
(Continued)

selected candidate color standard and identified variants are displayed on the display of the mobile device.

20 Claims, 1 Drawing Sheet

(51) Int. Cl.
*G01J 3/46* (2006.01)
*G01J 3/52* (2006.01)
(58) Field of Classification Search
CPC ......... G01J 3/0264; G09G 5/02; G01N 31/00; G06F 19/00; H04H 7/00
See application file for complete search history.

(56) References Cited

U.S. PATENT DOCUMENTS

| 2005/0275842 | A1* | 12/2005 | Simons | G01J 3/463 |
| | | | | 356/402 |
| 2006/0044559 | A1 | 3/2006 | Foy-Watson | |
| 2007/0032965 | A1* | 2/2007 | McClanahan | G01J 3/02 |
| | | | | 702/32 |
| 2007/0035554 | A1* | 2/2007 | McClanahan | G01J 3/46 |
| | | | | 345/589 |
| 2008/0291449 | A1* | 11/2008 | Rodrigues | G01J 3/46 |
| | | | | 356/402 |
| 2011/0085169 | A1* | 4/2011 | Craighead | G01J 3/46 |
| | | | | 356/425 |

FOREIGN PATENT DOCUMENTS

| WO | 2004/042336 | 5/2004 |
| WO | 2007/018795 | 2/2007 |
| WO | 2008/121358 | 10/2008 |
| WO | 2009/070459 | 6/2009 |
| WO | 2009/144222 | 12/2009 |
| WO | 2009/148888 | 12/2009 |
| WO | 2010/051294 | 5/2010 |

OTHER PUBLICATIONS

European Search Report for EP Application No. 11194959.0, dated May 29, 2012.

* cited by examiner

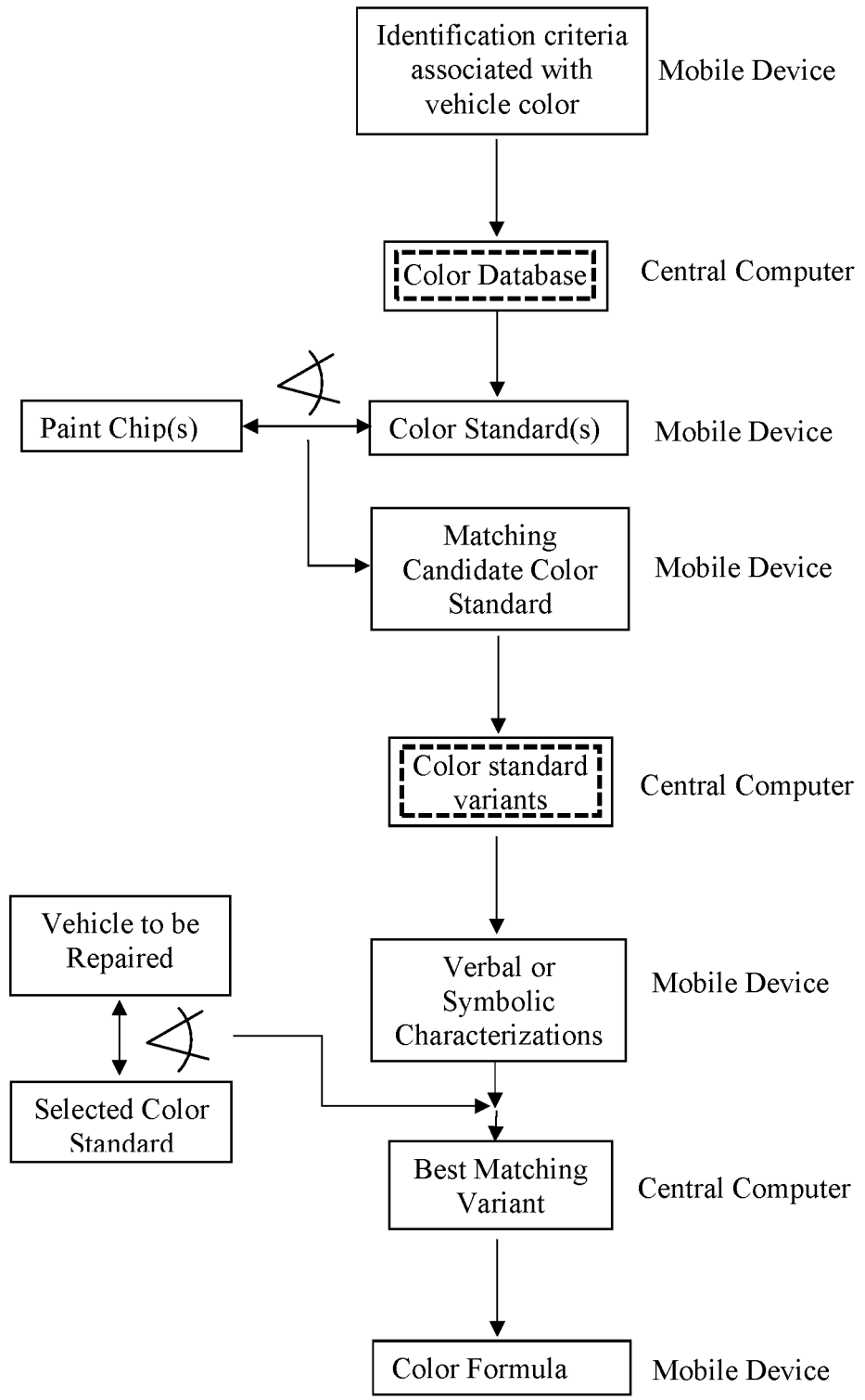

COLOUR VARIANT SELECTION METHOD USING A MOBILE DEVICE

CROSS-REFERENCE TO RELATED APPLICATIONS

This application is the U.S. National Phase of PCT/EP2012/076105, filed on Dec. 19, 2012, and claims the benefit of EP Application No. 11194959.0, filed on Dec. 21, 2011, and U.S. Provisional Application No. 61/582,606, filed on Jan. 3, 2012.

The invention relates to a method of selecting the most probable variant of a paint candidate colour standard for vehicle repair.

FIELD OF THE INVENTION

Background of the Invention

Colour variants are variants of the same standard colour of coated substrates, such as automobiles, which occur due to small variations in the process conditions, for example at different manufacturing sites, or due to batch-to-batch variations of paints or the ingredients thereof. Although these differences may be unnoticeable on separate vehicles, when they are present on one body panel or on adjacent body panels, such as a hood and a fender, of the same vehicle, the differences can be visually perceptible. These colour variations make it difficult to attain an excellent colour match in an automobile body repair shop.

Typically, three to six variants are used to cover the range of variants of one standard colour occurring in the field. For colour matching during automobile repair it is not only required to select the correct standard colour, but also to select the best matching colour variant. It is to be understood that it is also possible that the standard colour gives the best match. Actually, from a given number of colour variants, one specific variant may be arbitrarily defined as standard. Often, the most frequently used variant may be defined as standard. Therefore, the standard colour is included in the number of colour variants from which the best match is selected.

A known method for colour variant selection is to provide the bodyshops with swatches of the standard colour and of each colour variant of the standard colour. The sprayer can select the best matching swatch by visual comparison of the automobile surface to be repaired and the swatches. Each swatch corresponds to a colour variant and an associated paint recipe. The paint recipe corresponding to the swatch having the lowest overall deviation for visual properties is selected as the best matching recipe. However, it is expensive and wasteful to provide all automobile body shops with swatches of thousands of colour variants and to update the system regularly. Also, due to variations in the swatch preparation process, colour swatches sometimes differ in colour properties from the actual target colour sprayed by the user.

International patent application WO 2009/144222 describes a method of determination of a matching variant of a standard colour of a repair paint matching the effect colour of an object to be repaired, the method comprising the steps of
a) determination of the standard colour of the object to be repaired, and
b) determination of the best matching variant of the standard colour from a given number of variant colours, wherein a swatch coated with the colour of the standard colour is visually compared under at least two different angles of illumination and/or observation with the colour to be matched, the visual deviation from the standard colour and the colour of the object to be matched being evaluated on the basis of predetermined deviations for the visual properties, wherein the predetermined visual properties comprise at least one colour property and at least one texture property, based on the predetermined deviations for the visual properties of the standard colour and the colour of the object to be matched, the best matching variant of the standard colour is determined.

International patent application WO 2007/018795 describes a system and method to determine a paint formula that matches the colour of paint of a vehicle that is to be painted in a collision center. A plurality of paint formulas is stored in a database. A portable device is mobile relative to the vehicle and is in communication with the database via a wireless connection. Vehicle information is inputted into the portable device and sent to the database. The database determines the paint formula based on the vehicle information. The paint formula is communicated to the portable device. The portable device may display a colour representation of the colour of the paint formula which can be instantly compared to the existing colour of the vehicle before mixing the paint or painting the vehicle.

International patent application WO 2009/148888 describes a process wherein the colour shift direction of a variant colour is indicated as a symbol on a computer display.

Drawbacks of the known methods of colour variant selection are that they either require a large number of physical paint chip samples to be present in every automobile repair body shop, or that specific and expensive computer hardware is required in the automobile repair body shop. More in particular, displaying images of paint chips representing variants of one standard colour, and selecting the variant having the best match with an automobile to be repaired, requires very expensive electronic display screens, as well as meticulous calibration procedures of the display screens. The use of non-calibrated display screens, such as present in mobile phones and other mobile devices, for selecting variants of a standard color has so far not been possible, because such display screens lack color accuracy. Moreover, different devices having displays screens differing in resolutions, size, and colour accuracy are encountered in the field. This makes it even more difficult to use such devices for the selection of colour variants, i.e. colours which are very similar.

The present invention seeks to alleviate these drawbacks.

BRIEF SUMMARY OF THE INVENTION

The invention now provides a method of selecting the most probable variant of a paint candidate colour standard for vehicle repair using a mobile device having a colour display and an input unit and which is capable of data exchange with a central computer via an at least partly wireless communication line, the method comprising the steps of
a) Entering identification criteria in the mobile device which can be associated with the colour of the vehicle,
b) Sending the identification criteria via the at least partly wireless communication line to the central computer comprising a colour database,
c) Causing the software on the central computer to select one or more candidate colour standards matching the entered identification criteria and sending, via the at least partly wireless communication line, information on the selected candidate colour standards to the mobile device, d) Displaying information on the selected candidate colour standards on the display of the mobile device, e) Visually comparing one or more physical chips painted with the candidate colour standards, with the colour of the vehicle to be repaired, f) Selecting a matching candidate colour standard, inputting the selection in the mobile device, and transmitting the selection to the central computer via the at least partly wireless communication line, g) Causing the software on the central computer to identify variants of the selected candidate colour standard, h) If at least one variant has been identified, providing verbal or symbolic characterizations describing visual differences between the selected candidate colour standard and each identified variant, and displaying these characterizations on the display of the mobile device, i) Selecting the best matching variant based on the visual comparison of the vehicle to be repaired and the selected candidate colour standard, and the displayed verbal or symbolic characterizations, j) Transmitting via the at least partly wireless communication the selected variant from the mobile device to the central computer, and k) Transmitting via the at least partly wireless communication line a paint formula or a link to a paint formula corresponding to the selected variant from the central computer to the mobile device.

BRIEF DESCRIPTION OF THE DRAWING

The drawing graphically displays a method according to the invention comprising, a) entering in the mobile device identification criteria that can be associated with the color of the vehicle, b) sending the identification criteria via the at least partly wireless communication line to the central computer, wherein the central computer comprises a color database, c) causing the software on the central computer to select one or more candidate color standards matching the entered identification criteria and sending, via the at least partly wireless communication line, information on the selected candidate color standards to the mobile device, d) displaying information on the selected candidate color standards on the display of the mobile device, wherein the information includes images of the selected candidate color standards, e) visually comparing one or more physical chips painted with the candidate color standards with the color of the vehicle to be repaired, f) selecting a matching candidate color standard, inputting the selection in the mobile device, and transmitting the selection to the central computer via the at least partly wireless communication line, g) causing the software on the central computer to identify variants of the selected candidate color standard, h) if at least one variant has been identified, providing verbal or symbolic characterizations describing visual differences between the selected candidate color standard and each identified variant, and displaying these characterizations on the display of the mobile device, i) selecting the best matching variant based on (1) visual comparison of the vehicle to be repaired and the selected candidate color standard and (2) the displayed verbal or symbolic characterizations, j) transmitting via the at least partly wireless communication line the selected variant from the mobile device to the central computer, and k) transmitting via the at least partly wireless communication line a paint formula or a link to a paint formula corresponding to the selected variant from the central computer to the mobile device.

DETAILED DESCRIPTION OF THE INVENTION

The method of the invention does not require a large number of physical paint chip samples to be present in every automobile repair body shop. In one embodiment, the method does not require physical paint chip samples at all and entirely relies on images displayed on the mobile device. Alternatively, the method uses a reduced number of physical paint chip samples, because samples of variants of the standard colours are not required. The method does not require specific and expensive computer hardware in the automobile repair body shop. Actually, the method can be implemented on mobile devices which are everyday items and probably present anyway, such as a mobile communication device having a colour display.

The method of the invention is suitable for selecting the most probable variant of a paint candidate colour standard for vehicle repair. Examples of vehicles include automobiles, trucks, buses, airplanes, bicycles, and motorcycles. The method utilizes a mobile device having a colour display and an input unit. Examples of suitable mobile devices are mobile phones, including so-called smart phones, tablet computers, personal digital assistants, and other portable devices, such as laptop computers. Examples of input units of the mobile device are a keyboard, a touch pad, or a touch screen, i.e. an input device which is integrated in the display, as well as combinations and variants of these. Voice controlled input units are likewise possible. The mobile device is further capable of data exchange with a central computer via an at least partly wireless communication line. The central computer may be on a remote location, but it may likewise be relatively close to the mobile device, for example in a different office or in a server room located on the same premises as the mobile device. Typically, the central computer is in a remote location and is capable of data exchange with a plurality of mobile devices, either consecutively, or parallel. The data communication line between the mobile device may be entirely wireless, or at least partly wireless. When the communication line is partly wireless, at least the communication line between the mobile device and a wireless access point is wireless. The further communication line between the wireless access point and the central computer may also be entirely or partly wired. Examples of suitable wireless communication lines are wireless local area networks and wireless telecommunication networks of telecommunication service providers.

In the first step of the method, identification criteria which can be associated with the colour of the vehicle are entered in to the mobile device. In one embodiment, the identification criteria include vehicle identification data. These typically include at least one of the vehicle brand, vehicle model, year of production, colour code, colour group, or VIN code. Alternatively or additionally, data which can be associated with colour of the vehicle include colourimetric data acquired by measurement of the visual properties of the exterior coating of the vehicle, such as spectrophotometric data, or by visual comparison of the vehicle surface to be repaired with physical samples, generally referred to as chips, painted with reference colours. The data may also include texture obtained by means of a digital imaging device, such as a CCD camera. This can include phenomena as coarseness, glints, micro-brilliance, cloudiness, mottle, speckle, sparkle or glitter. Generally, texture is defined as the visible surface structure in the plane of the paint film depending on the size and organization of small constituent parts of a material. In this context, texture does not include roughness of the paint film but only the visual irregularities in the plane of the paint film. Structures smaller than the resolution of the human eye, contribute to "colour", whereas larger structures generally also contribute to "texture". In a further embodiment, a digital picture of the car may be comprised in the data. The digital picture may be analyzed by software to extract information such as car make or colour group. The analyzing software may reside in the mobile device, in the central computer, or in a different computer.

In the next step the data entered in the mobile device are sent to the central computer via the at least partly wireless communication line. The central computer comprises a colour database. In the colour database, properties of specific colours are stored and associated with vehicle data. The colour data in the database generally comprises colour data, for example based on spectrophotometric data, and texture data. The colour database comprises information on standard colours and information on variants of these standard colours. It is to be understood that the data mentioned above may also be distributed over more than one database.

On the basis of the data transferred from the mobile device, the software running on the central computer selects one or more candidate colour standards matching the entered identification criteria. Subsequently, the central computer sends information on the selected candidate colour standards via the at least partly wireless communication line to the mobile device. The spectrophotometric reflection data and texture data of the selected candidate colours are converted into digital images of the selected candidate colour standards. The conversion is generally calculated on the central computer or on the mobile device. However, the conversion may also be calculated on an intermediate device.

In the next step, information on the selected candidate colour standard is displayed on the mobile device. The information may be textual information, for example a colour code or colour name. Also, information relating to the identification of a physical colour chip representing the selected candidate colour standard may be displayed.

The user compares a physical colour chip representing the selected candidate colour standard with the colour of the vehicle to be repaired.

Optionally, images of the selected candidate colour standards may be displayed on the colour display of the mobile device. This option is of particular interest in cases where the quality of the colour display of the mobile device is high and sufficient to produce a realistic image of the selected candidate colour standard.

The user may then visually compare the image of the colour displayed on the mobile device with the colour of the vehicle to be repaired If the software on the central computer has selected more than one candidate colour standard, the user will generally compare all proposed candidate colour standards with the colour of the vehicle to be repaired. Based on the comparison, the user will select the most promising matching candidate colour standard. If only one single candidate colour standard has been proposed, the user can either select or refuse that. Once the user has selected a candidate colour standard, the user inputs the selection in the mobile device, whereupon the selection is transmitted to the central computer via the at least partly wireless communication line. In one embodiment, after step e) a verbal or symbolic characterization of the visual difference between the colour of the vehicle coating and the colour standard is entered into the mobile device and transmitted via the at least partly wireless communication line to the central computer. Upon receipt of the user selection, the software on the central computer identifies the available variants of the selected candidate colour standard in the database. Suitably, in the database, each variant of a colour standard is associated with verbal and/or symbolic characterizations describing visual differences between the variant and the standard colour. These characterizations may be stored in the database. Alternatively, these characterizations may be calculated based on the colour (reflection) data and texture data of the colour variants and of the standard colour. The calculation may be carried out on the central computer, on the mobile device, or on an intermediate computer.

When not generated on the mobile device, the verbal and/or symbolic characterizations are transmitted to the mobile device and displayed thereon.

Suitably, the verbal and/or symbolic characterizations comprise at least one colour property and at least one texture property. Examples of colour properties include lightness, colour direction, saturation, and hue. Examples of visual texture properties include coarseness and sparkle. Generally, differences for at least three visual properties are displayed. The accuracy of the determination of the best matching variant can be improved when differences are displayed for more visual properties, for example for four or five visual properties. However, the number of deviations for visual properties to be determined should not become too large, because otherwise the method will be overly time-consuming for the operator, which would make it less attractive for use in an automobile body repair shop. Therefore, generally differences for at most eight, or six, visual properties is displayed.

In one embodiment, for the identified colour variants, both colour (reflection) data and texture data are retrieved. The reflection data and texture data of each identified colour variant are compared to the corresponding values of the associated colour standard. From this comparison, a verbal or symbolic characterization can be calculated that summarizes the most characteristic visual differences between each identified variant as compared to the colour standard. An example of a verbal characterization is: "Variant A is visually most different from the colour standard in the flop angle; in the flop angle variant A is much lighter, more bluish and more coarse than the colour standard; in the face angle variant A is darker and having less sparkle than the colour standard".

An example of a symbolic characterization is a graphical representation of the flop angle, followed by a dark square signifying a darker colour, a blue square signifying a more bluish colour, and a textured square signifying more coarseness.

The verbal or symbolic characterizations of the visual differences between each identified variant and the colour standard can be displayed as text or symbols on the mobile device.

In one embodiment, the mobile device also shows digital images of the identified colour variants. In that case, the retrieved reflection data and texture data are converted into digital images representative of the associated colour variants. This conversion may be calculated either on the central computer, or on the mobile device of the user, or on an intermediate computer. Alternatively, the conversion can be calculated and stored in advance, and the stored digital images are retrieved. The digital images of the identified colour variants are displayed on the electronic display of the mobile device, optionally together with textual or other information related to these colour variants. Optionally, the colour and/or texture differences between colour standard and each of the variants are exaggerated in the digital images of the colour variants, in order to make it easier for the user to select which variant is best matching the vehicle coating.

The user then selects the best matching variant. The selection is based on the visual comparison of the vehicle to be repaired and the selected candidate colour standard, and the displayed verbal and/or symbolic characterizations. If, for example, the coating on the vehicle is darker in colour and coarser in the effect properties than the candidate colour standard, the user would select a variant which is characterized as darker and coarser than the standard. In certain cases, it may also be possible that the candidate colour standard is selected as best match.

In a further embodiment, none of the proposed variants may be found to give a satisfactory match with the colour of the vehicle to be repaired. In this case, the user indicates that one of the variants is a best match, but still needs improvement. This information is transmitted from the mobile device to the central computer via the at least partly wireless communication line. The software repeats steps g) and h), but taking the selected colour variant as the reference colour, instead of using the colour standard as the reference colour. Based on this input, another colour variant may be identified that is best matching the colour and texture of the vehicle coating. Optionally, any other colour that is relatively close to the colour in the database may be used as the next reference colour, even if this other colour is known to occur for a different vehicle model or brand.

In a further embodiment, the user selects a reference colour, which can be the colour standard or one of the colour variants. A digital image for this reference colour is calculated and displayed on the mobile device. In a process guided by the software on the mobile device or the central computer, the user can input a characterization of the visual difference between the reference colour and the colour of the vehicle coating. For example, the user may input that the vehicle colour, as compared to the reference colour, either in its displayed form or as physical colour chip, is most different from the reference colour in the flop angle; in the flop angle the vehicle colour is much lighter, more bluish and more coarse than the reference colour; in the face angle the vehicle colour is darker and having less sparkle than the reference colour. In one embodiment, based on this input, the software on the mobile device or the central computer changes the displayed image accordingly. In an iterative process, these steps are repeated until the user indicates that the best possible match is obtained between the displayed image of the modified reference colour and the colour of the vehicle coating. Alternatively, these steps are repeated until the user indicates that the difference between the displayed image of the modified reference colour and the displayed reference colour is best agreeing with the difference the user observes when comparing the colour of the vehicle coating with the colour of the physical chip of the reference colour.

Using all input generated in this way, the colour variant best matching the colour of the car coating is identified by the software on the central computer.

The user then inputs the selected variant having the best match in the mobile device, and the selection is transmitted via the at least partly wireless communication line to the central computer. In one embodiment, one or more images of the selected variant is displayed on the mobile device.

In response, a paint formula corresponding to the selected variant is transmitted from the central computer to the mobile device via the at least partly wireless communication line. The paint formula is the recipe to prepare the corresponding paint. This enables the user to prepare a paint of the correct colour and texture properties to match the vehicle. Alternatively, instead of transmitting the entire paint formula to the mobile device, it is also possible to transmit a link to a paint formula. The link may devise a route to a repository of paint formulae in non-electronic form, for example a book or folder. Alternatively, the link may show a route to an electronic data carrier containing the paint formula, such as a magnetic or optical data storage device. The storage device may be available locally. Alternatively, the storage device may be a remote storage device, which may be accessible via a data communication line.

In a further embodiment, in addition or as alternative to sending the paint formula to the mobile device, the central computer may send the paint formula to a different device, for example weighing station of a paint mixing installation. In a still further embodiment, the central computer may send information on where to retrieve a pre-mixed sample of a paint having the selected colour.

In one embodiment, when the mobile device is equipped with a digital camera, the method includes the step of displaying an image of the vehicle on the colour display of the mobile device, next to the images of colour standard and colour variants. In this way, a better visual comparison may be possible.

In a further embodiment, the software on the mobile device or on the central computer includes the possibility to display a series of digital images on the mobile device that differ only in texture, such as coarseness, but do not change in colour. By comparing these digital images with the vehicle coating, the user is able to select the texture value best matching the vehicle coating. This is a digital version of the so-called coarseness-swatch, a paper form of documentation well known in bodyshops, which is a series of grey paint chips which are constant in colour (grey) but that gradually differ in coarseness. The digital version has the advantage that it is possible to colour the digital chips such that its colour is close to the colour of the vehicle coating.

In a further embodiment, additional information relating to the location of the mobile device is sent to the central computer via the at least partly wireless communication line. In this case, the indication of the location of the mobile device is taken into account in the selection of candidate colour standards and/or the selection of variants. Information relating to the location of the mobile device may, for example, be derived from a communication network to which the mobile device is connected, or from position determination means, such as GPS. Taking into account such information may improve the accuracy or the speed of the selection process, because the probability of the occurrence of a certain colour or a variant thereof may depend on the region. As an example, a vehicle may be sold with a specific colour on the European market only. It is then very improbable, that this specific colour should be selected, when the central computer receives a query from a mobile device positioned outside Europe.

In a still further embodiment, technical information relating to the display of the mobile device is sent from the mobile device to the central computer. This information is then taken into account for displaying the information on the mobile device. As an example, the resolution of the display of the mobile device may be taken as a criterion for the size and number of images, which can be displayed in the mobile device. Also, when the display of the mobile device is of lower quality, it can be preferred to use verbal or symbolic characterizations of colours and colour variant, rather than displaying images thereof.

In a further embodiment, next to the image representing the candidate colour standard a second adjustable image is displayed on the mobile device, wherein the second image initially is equal to the image of the candidate colour standard. The user is then led through a process guided by the software on the mobile device or on the central computer, making the user to input a characterization of the visual difference between the colour of the vehicle coating and the physical colour chip of the candidate colour standard. The second adjustable image is iteratively modified based on the characterization inputted by the user, until the visual difference between the two images displayed on the mobile device, representing the selected candidate colour standard and the adjusted image, is best representing the visual difference between the physical colour chip of the candidate colour standard and the colour of the vehicle coating. Via the at least partly wireless communication line the set of modifications required to best represent the visual difference by the displayed images is transmitted from the mobile device to the central computer.

In a further embodiment, based on input provided by the user, for example a verbal or symbolic characterization of the visual difference between the reference colour and the colour of the vehicle, a modification of the paint recipe is calculated that is expected to result in a paint that best matches the colour of the vehicle.

The invention claimed is:

1. A method of selecting the most probable variant of a matching paint candidate color standard for vehicle repair using a mobile device having a color display and an input unit and which is capable of data exchange with a central computer via an at least partly wireless communication line, the method comprising,
    a) entering in the mobile device identification criteria that can be associated with the color of the vehicle,
    b) sending the identification criteria via the at least partly wireless communication line to the central computer, wherein the central computer comprises a color database,
    c) causing the software on the central computer to select one or more candidate color standards matching the entered identification criteria and sending, via the at least partly wireless communication line, information on the selected candidate color standards to the mobile device,
    d) displaying information on the selected candidate color standards on the display of the mobile device, wherein the information includes images of the selected candidate color standards,
    e) visually comparing one or more physical chips painted with the candidate color standards with the color of the vehicle to be repaired,
    f) selecting a matching candidate color standard, inputting the selection in the mobile device, and transmitting the selection to the central computer via the at least partly wireless communication line,
    g) causing the software on the central computer to identify variants of the selected candidate color standard,
    h) if at least one variant has been identified, providing verbal or symbolic characterizations describing visual differences between the selected candidate color standard and each identified variant, and displaying these characterizations on the display of the mobile device,
    i) selecting the best matching variant based on (1) visual comparison of the vehicle to be repaired and the selected candidate color standard and (2) the displayed verbal or symbolic characterizations,
    j) transmitting via the at least partly wireless communication line the selected variant from the mobile device to the central computer, and
    k) transmitting via the at least partly wireless communication line a paint formula or a link to a paint formula corresponding to the selected variant from the central computer to the mobile device.

2. The method according to claim 1, wherein the identification criteria in a) include vehicle identification data.

3. The method according to claim 2, wherein the vehicle identification data in a) include at least one of a vehicle brand, a vehicle model, a year of production, a color code, a color group, or a VIN code.

4. The method according to claim 1, wherein the identification criteria in a) include colorimetric data obtained by spectrophotometric measurement of a surface of the vehicle to be repaired or by visual comparison of a surface of the vehicle to be repaired with chips painted with reference colors.

5. The method according to claim 1, wherein the matching paint candidate color standard is an effect paint color having color and texture properties.

6. The method according to claim 1, wherein in d) additional information relating to the selected candidate color standard are displayed on the display of the mobile device.

7. The method according to claim 1, wherein in h) verbal or symbolic characterizations describing visual differences between the multiple identified variants are also provided.

8. The method according to claim 1, wherein in h) images of the identified variants are displayed on the mobile device.

9. The method according to claim 1, wherein in k) one or more images of the selected variant is displayed on the display of the mobile device.

10. The method according to claim 1, wherein after e) a verbal or symbolic characterization of the visual difference between the color of the vehicle and the color standard is entered into the mobile device and transmitted via the at least partly wireless communication line to the central computer.

11. The method according to claim 1, wherein additional information relating to the location of the mobile device is sent to the central computer via the at least partly wireless communication line, and wherein the indication of the location of the mobile device is taken into account in the selection of candidate color standards and/or the selection of variants.

12. The method according to claim 1, wherein technical information relating to the display of the mobile device is sent from the mobile device to the central computer, and wherein this information is taken into account for displaying the information on the mobile device.

13. The method according to claim 6, wherein next to the image representing the candidate color standard a second adjustable image is displayed on the display of the mobile device, wherein the second adjustable image initially is equal to the image of the candidate color standard, and further leading the user through a process guided by the software on the mobile device or on the central computer, making the user to input a characterization of the visual difference between the color of the vehicle and the physical chip painted with the candidate color standard, and wherein the second adjustable image is iteratively modified based on the characterization inputted by the user, until the visual difference between the two images displayed on the mobile device, representing the selected candidate color standard and the adjusted image, is best representing the visual difference between the physical chip painted with the candidate color standard and the color of the vehicle coating, and transmitting via the at least partly wireless communication line the set of modifications required to best represent the visual difference by the displayed images, from the mobile device to the central computer.

14. The method according to claim 4, wherein the matching paint candidate color standard is an effect paint color having color and texture properties.

15. The method according to claim 4, wherein in d) additional information relating to the selected candidate color standard are displayed on the display of the mobile device.

16. The method according to claim 3, wherein in h) verbal or symbolic characterizations describing visual differences between the multiple identified variants are also provided.

17. The method according to claim 3, wherein in h) images of the identified variants are displayed on the mobile device.

18. The method according to claim 5, wherein in k) one or more images of the selected variant is displayed on the display of the mobile device.

19. The method according to claim 8, wherein additional information relating to the location of the mobile device is sent to the central computer via the at least partly wireless communication line, and wherein the indication of the location of the mobile device is taken into account in the selection of candidate color standards and/or the selection of variants.

20. The method according to claim 9, wherein technical information relating to the display of the mobile device is sent from the mobile device to the central computer, and wherein this information is taken into account for displaying the information on the mobile device.

\* \* \* \* \*